United States Patent Office 3,238,668
Patented Mar. 8, 1966

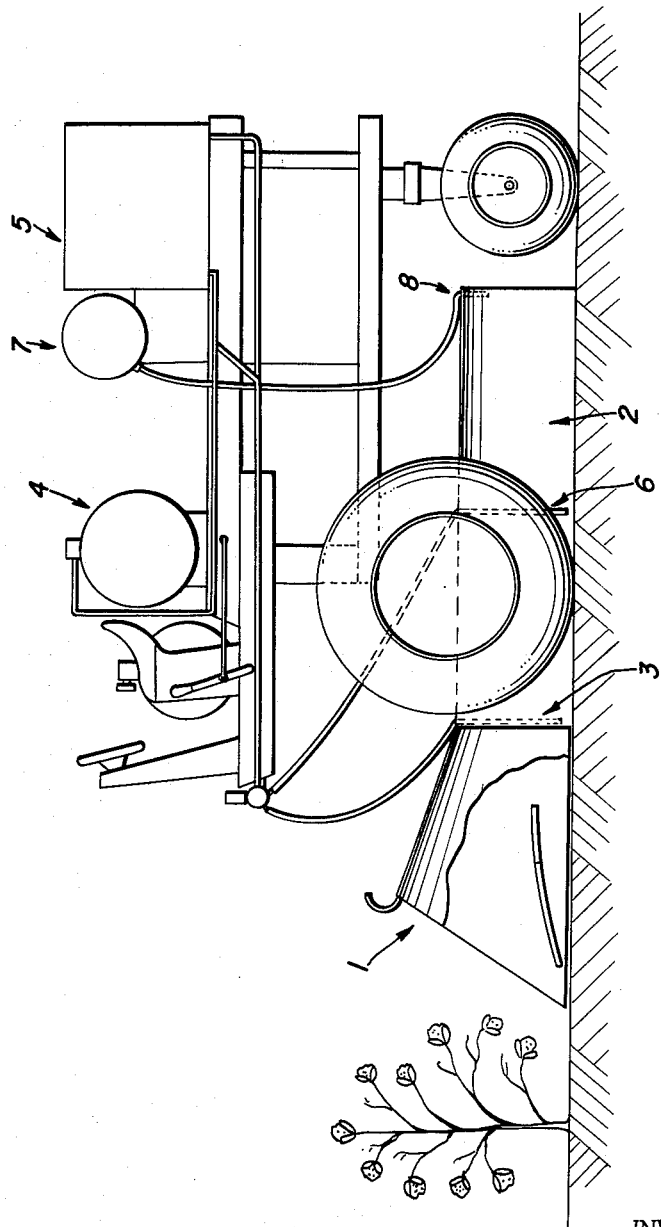

3,238,668
APPARATUS EMPLOYING AMMONIA FOR ROW CROP DEFOLIATION
Earl C. Abbott and Howard Donovan Green, Memphis, Tenn., and Joseph B. Skaptason, Kansas City, Mo., assignors to W. R. Grace & Co., New York, N.Y., a corporation of Connecticut
Filed Dec. 21, 1962, Ser. No. 246,536
1 Claim. (Cl. 47—1.7)

This invention relates to the treatment of living plants. In one specific aspect it relates to the chemically induced defoliation of row crops before harvesting.

In summary, this invention involves an improvement in the known method of defoliating row crops with ammonia by moving a conventional elongated contacting zone, or hood, having a flared mouth for reflecting plants into the hood, lengthwise along the crop row while feeding ammonia through ports to the system. In this conventional equipment the ports are placed in the flared mouth. In the improvement constituting this invention, however, ammonia is fed into the device through ports placed in the fore part of the zone, or hood, behind the juncture of the mouth and hood body sections thereby permitting plants in the mouth section to serve as a vapor barrier which prevents the escape of ammonia from the front of the contacting zone and also prevents entrance of wind into the contacting zone. This port spacing is essential because in the experimentation leading to this invention it was found that escaping ammonia contacting plants in adjacent rows, shocks them, and closes their stomata thereby rendering the shocked plants insensitive to defoliation on subsequent treatment with ammonia in the contacting zone. With the process and apparatus of our invention, substantially complete defoliation has been obtained with ammonia feed rates ranging from about 40–120 pounds per acre, as compared to 150–300 pounds per acre needed with ammonia defoliator equipment of the prior art, which lacked the port location of this invention.

The equipment used in the practice of this invention is shown in FIGURE 1. As will be noted, the main difference over the conventional defoliator is the change in the location of the ammonia ports (from inside the mouth to a location just behind the juncture of the mouth and the hood body). In FIGURE 1 the flared mouth is shown at 1, the hood at 2, the main ammonia ports at 3, ammonia cylinder at 4, ammonia vaporizer at 5, middle ammonia ports at 6, water tank at 7, and rear water spray at 8.

Preferred embodiments of our invention include the use of ammonia feed rates ranging from about 60–90 pounds per acre while moving the contacting zone along the crop row at a speed of about 3–4 miles per hour. A water sprayer at the exit end of the contacting zone has been found desirable, because it prevents the escape of unused ammonia into the atmosphere where the escaping ammonia may close stomata of plants in adjacent rows. This is especially true when ammonia feed rates in excess of 100 pounds per acre are used. Normally, for best results all of the ammonia should be admitted through a set of ports located immediately behind the juncture of the mouth and body sections of the elongated contacting zone. Nevertheless, under some conditions, such as those present after a mild drought, it has been found advantageous to place a second set of ammonia ports at about the midpoint of the elongated contacting zone; about ¼–⅓ of the total ammonia (either as vapor or mist as hereinafter described) is fed through these secondary ports.

The advantages of our invention are best understood when considered with the rationale and current status of chemical defoliation.

Leaves on the stalks of row crops and on weeds growing with these crops are a handicap to harvesting, because leaves and leaf juices interfere with the functioning of mechanical harvesters and cause the accumulation of trash in the harvested crops. As a result, considerable interest has developed in the defoliation of row crops before harvesting. Defoliation of cotton has received the most attention with the result that cotton defoliaion has become a matter of great economic importance. The defoliation of other row crops, especially soy beans—including weeds growing in the bean fields— is receiving increased attention.

In the commercial growing of cotton it has been necessary to make several pickings by hand, because all the bolls do not riped at the same time. Bolls on the lower branches mature first, and opening of bolls on the upper branches occurs over a period of several weeks after the lower bolls have matured. In recent years, the shortage and cost of labor and the trend toward large scale farming have made mechanical picking very desirable. The presence of leaves on cotton stalks is an especially severe handicap to mechanical harvesting, because leaves present a barrier which hampers the picking means from reaching the bolls, and adds trash to the cotton. Also, if green leaves are rubbed against the cotton, juices are exuded and stain the cotton fibers. Thus, it is highly desirable that the leaves be removed from cotton plants before harvesting the crop mechanically.

If the leaves of a plant are injured by physical or chemical means, or if they are cut leaving stems, abscission layers of cells grow across the petiole bases causing the leaves or leaf stems to drop off. In case of cotton, the formation of abscission layers disrupts the metabolic processes of the plants and causes the upper bolls to ripen and open more rapidly, thereby facilitating the use of mechanical pickers.

Although cotton defoliation is of special value when mechanical pickers are used, it also aids hand picking, because the dew dries out quicker permitting the pickers to get an earlier start, and it is easier for the pickers to locate the bolls and gather the cotton when the plants are free of leaves.

Leaf removal also helps control the insect count. This is particularly true in respect to aphids, leafworms, and boll weevils. Since defoliation speeds up cotton harvesting, the stalks can be destroyed earlier. This is advantageous in areas that have plow-up programs to aid in the control of boll worms, and boll weevils.

To obtain the best results with cotton, the boll load should be heavy and vegetative development stopped. Normally, about 50%–70% of the bolls should open before a chemical defoliant is applied. Practically no damage to the crop will occur if most of the bolls are full size and firm to the touch at the time of defoliation. If the bolls are not full size and are soft when the plants are defoliated, the yield may be reduced and seed and fiber quality may be lowered.

At the present time most defoliants are contact herbicides which cause defoliation when applied at low rates. At slightly higher rates these materials produce rapid desiccation and killing of leaves, stems, and other plant parts before the abscission layers form. Desiccation is very objectionable with cotton, because leaves of dead plants set so firmly that few of them drop, boll development ceases, abscission of the bolls occurs, and the plant stems become brittle so that bolls are easily broken off and lost during harvesting. When legumes are desiccated, large numbers of seed pods drop off. Cyanamide compounds, organic phosphorus compounds, arsenic compounds, and chlorates are the principal defoliants used at the present time. Cyanamide is difficult to use because it requires a considerable amount of dew or other moisture. Practically no defoliation occurs when this material is applied in the absence of moisture. Arsenic and phosphorus compounds are poisonous, and chlorates leave phytotoxic residues in the soil. Furthermore, irregular defoliation is obtained with these materials, and defoliation is seldom more than about 60%–75% complete. There is known the treatment of cotton plants with hot combustion gases to produce defoliation. A process of this type is extremely difficult to use, because the temperature must be controlled very closely. If the gas is too cool, little or no defoliation will be obtained; if it is too hot, desiccation of boll abscission will result. Various devices have been suggested for mechanically removing foliage from cotton plants. Although the use of such devices increases the efficiency of cotton picking to a limited extent, only partial defoliation has been obtained with these machines.

It is an object of the present invention to provide a means for defoliating row crops such as cotton, soy beans, corn, milo and the like after the crop is made, whereby the plants and weeds growing with them will be rendered substantially free of leaves so that the crops may be harvested mechanically or by hand to yield products that contain little trash and are free of leaf stain.

It has recently been discovered that contact with gaseous ammonia will cause the defoliation of plants. However, previous attempts to defoliate plants with gaseous ammonia have been characterized by spotty results, an average defoliation of about 75% at our ammonia rates, and high ammonia usage accompanied by a high ammonia loss at higher defoliation rates. In addition to constituting a danger and annoyance to the operator requiring him to use a fresh air mask and protective clothing, the escaping ammonia was a hazard to all animal life. We have discovered that improper location of ammonia ports is a major factor contributing to the poor results obtained when defoliating row crops with ammonia according to the teaching of the prior art. Placing these ports in the mouth section of the elongated contacting zone, as taught by the prior art, permits a considerable portion of the ammonia to be blown away before it enters the body section of the contacting zone. This results in the loss of considerable ammonia. Worse yet, the escaping ammonia may close the stomata of plants in adjacent rows. Although the concentration of the escaping ammonia is too low to produce appreciable defoliation, it is sufficiently high to shock any plants that it contacts into closing their stomata. This renders the shocked plants insensitive to defoliation on subsequent exposure to ammonia in the contacting zone, because during experimentation leading to this invention it was found that ammonia enters the plants through their stomata.

We have discovered two methods of application of our invention (as above described) which give substantially complete defoliation at low ammonia rates without the hazard attendant to the prior art process.

One means that we have used for defoliating row crops with ammonia, using our invention, comprises completely vaporizing liquid ammonia in a portable heat exchanger mounted on the ammonia defoliator and contacting the plants with the resulting super heated gaseous ammonia in an elongated contacting zone, or hood, as the hood is moved lengthwise along the crop row. This type of equipment is well known, for example see Farm Journal, August 1961. A novel feature of our invention comprises the location of the ammonia ports. We place the ports in the fore part of the body section of the elongated contacting zone. As a preferred embodiment we locate the ammonia ports immediately behind the juncture of the mouth and body sections of the hood. Plants in the mouth section serve as a vapor barrier which prevents the escape of ammonia from the front end of the elongated contacting zone. This arrangement provides a means for exposing plants in the body section of the contacting zone to a gas comprising substantially an atmosphere of ammonia while minimizing both the chance for escaping ammonia to close the stomata of plants in adjacent rows and the entrance of wind into the hood. Normally, for best results, all ammonia should be admitted immediately behind the juncture of the mouth and body sections of the contacting zone. Nevertheless, under some conditions, such as those present after a mild drought, it has been found advantageous to place a second set of ammonia ports at about the midpoint of each elongated contacting zone.

The other means that we have discovered for attaining substantially complete defoliation of plants at low ammonia feed rates, using our invention, comprises passing liquid ammonia under pressure through ports that convert the liquid into an extremely fine mist and delivering this mist into the body section of an elongated contacting zone where the liquid is immediately vaporized by heat from the surroundings to produce a gas comprising substantially an atmosphere of ammonia. This is a very significant discovery, because previous attempts to defoliate row crops by the application of liquid ammonia as a spray of coarse droplets were characterized by extremely poor results. Defoliation was about 40% complete; even this low degree of defoliation was accomplished only by the application of ammonia at a very high rate—well above 200 pounds per acre. This high ammonia usage was accompanied by a high ammonia loss. We have found that the high ammonia feed rate needed when using liquid ammonia was due to the fact that direct application of drops of liquid ammonia to leaves burns leaves at the points of contact but does not produce appreciable defoliation, and further, that substantially all defoliation obtained when feeding liquid ammonia whether by our fine mist or by the coarse droplets of the prior art, is produced by ammonia gas formed when the liquid vaporizes. As a consequence, only those leaves exposed to a sufficiently high concentration of gaseous ammonia drop off; unexposed or underexposed leaves do not fall.

By ammonia "mist" we mean droplets of ammonia so fine that they evaporate completely to ammonia vapor within one second or less at ambient temperature. Such droplets have an average diameter less than 1 mm., in contradistinction to droplets of the prior art having an average diameter well in excess of 1 mm., and which may be detected as visible droplets on the leaves of treated plants for several minutes after application, even at temperatures as high as 90° F.

Calculations leading to this invention indicate that a temperature drop of only about 1–2° C. will occur in the hood when liquid ammonia, fed into the hood as a fine mist at the rate of 100 pounds per acre, is vaporized therein by heat from the surroundings. Results of these calculations constitute theoretical substantiation of our findings that previous poor results with liquid ammonia feed were due to the failure to produce sufficiently small ammonia droplets rather than to the nonavailability of sufficient heat to vaporize the liquid ammonia.

For reasons set forth above, when using the mist embodiment, we locate the ammonia ports within the body of the elongated contacting zone. We prefer to locate these ports immediately behind the juncture of the mouth and body sections of the hood. When defoliating under some conditions, such as those prevailing after a short drought, it is advantageous to locate a second set of ammonia mist ports at about the mid-point of the elongated contacting zone.

No defoliation occurs if ammonia is brought into contact with plants when the stomata are closed, because, as was recently discovered in the experiments leading to this invention, ammonia enters plants through the stomata. (See Example III.) This means that the ammonia must be applied during the daylight hours, because the stomata are closed at night. In the course of the aforesaid experiments it was also found that a period of insensitivity to defoliation with ammonia which may last from 6–10 hours or longer will be produced by contacting plants with doses of ammonia at rates of about 5–20 pounds per acre which are too low to produce defoliation. (See Example IV.) In addition, it has been found that water from sprayers placed at the exit ends of the elongated contacting zones substantially prevents the escape of unused ammonia into the atmosphere thereby preventing its contacting nearby plants and rendering them insensitive to defoliation. As shown in FIG. 1, this sprayer (or sprayers) is positioned directly on the top of the exit terminal of the body section of the hood. Furthermore, the ammonia solution produced when the escaping ammonia is dissolved in the water spray goes to the soil where it is absorbed as fertilizer.

The rate of ammonia application may be controlled by regulating the amount of ammonia fed to the vaporizer and by controlling the speed with which the elongated contacting zones move along crop rows. We have found that speeds below about 2 miles per hour are not practical due to the limited number of rows that can be treated in a day, and speeds in excess of about 5 miles per hour are too fast for convenient operation of the tractor on which our defoliator is mounted. Hence, our preferred speed is about 4 miles per hour. This corresponds to a preferred exposure time of about 2 seconds. Using our invention, we have obtained substantially complete defoliation of plants at ammonia rates ranging from about 40–120 pounds per acre, which is substantially less ammonia than that required to obtain the same results using prior art procedures. There was no tendency to burn or desiccate plant tissues at our higher ammonia rates. Rates below about 30 pounds per acre have failed to produce defoliation when using our preferred tractor speeds.

When defoliating plants with gaseous ammonia using the process of this invention, leaves on plants exiting the contacting zone are considerably lighter green than those of untreated plants. This indicates that ammonia attacks chlorophyll. Within about 15–30 minutes the treated leaves develop a bronze color, and in about 2–6 hours they feel dry when touched. After 8–14 days substantially all of the leaves drop from the plants. This treatment does not kill the plants; new leaves develop in a few weeks.

Our invention will be further illustrated by the following examples which are illustrative only and are not intended to limit the scope of the invention.

EXAMPLE I

*(Control)*

The equipment used was a conventional ammonia defoliator (Farm Journal, August 1961). As there described, the hood was 12 feet long. The ports for gaseous ammonia were placed in the front of the flared mouth, as is conventional practice, so that the plant in the mouth is thoroughly treated with ammonia vapor before it enters the hood proper. The run was thus a control to establish that when using the low rates of ammonia we have found suitable in practising our invention, there was no improvement over the prior art if the ports were placed in the mouth area as in the conventional practice.

Using this equipment, gaseous ammonia was applied during the sunlight hours at about 100 pounds per acre through ports conventionally located in the flared mouth section of the elongated contacting zone while moving the zone along cotton rows at about 4 miles per hour. Since 4 miles per hour is about 5.8 feet per second, residence time in a 12-foot hood is 12/5.8=about 2 seconds. Leaves of plants exiting the contacting zone were lighter green than those of untreated plants, and most of the treated leaves had turned bronze within about 30 minutes after being contacted with ammonia. However, only about 70% of the leaves had dropped from the treated plants 14 days after being exposed to the ammonia.

EXAMPLE II

*(Our invention using ammonia vapor embodiment)*

This run was similar to that of Example I, but it was modified by adding the ammonia vapor from ports located in the foremost portion of the elongated contacting zone immediately behind the juncture of the mouth and body sections of the contacting zone, in accordance with our invention. Defoliation of the treated plants was about 96% complete at the end of 14 days. A comparison of the results of this run with the results reported in Example I shows that a great improvement in defoliation is obtained by placing the ammonia ports in the body section instead of the mouth section of the elongated contacting zone.

EXAMPLE III

*(Effect of sunlight)*

In a series of runs made in late evening when feeding gaseous ammonia at about 90 pounds per acre, using the procedure of this invention, leaf damage became progressively less as the sun approached the horizon, and practically no defoliation occurred on plants that were treated after the sun had set. This effect was investigated further by making a run between 11:00 p.m. and 1:00 a.m. when it was completely dark. Gaseous ammonia was applied at about 100 pounds per acre. Results of this run were completely negative. The leaves did not change color after treatment with ammonia, and they did not dry out. No defoliation occurred. Since plant stomata are open only in daylight hours, it is evident from these experiments that ammonia has no defoliant effect when the stomata are closed, and therefore must act through open stomata. This work, taken with the experiment next described, provided considerable insight into why conventional ammonia defoliation procedures were frequently erratic.

EXAMPLE IV

An attempt was made to defoliate cotton that had previously been exposed to a low dosage of gaseous ammonia. Initially, the plants were exposed to ammonia at a rate of about 10 pounds per acre. No visible change occurred. About 3 hours later gaseous ammonia was applied at about 75 pounds per acre, using our invention, moving along the cotton rows at about 4 miles per hour. Results of this run were completely negative. Leaves of plants exiting the contacting zone were the same dark green color as those of untreated plants. The treated leaves had no tendency to dry out. At the end of 10 days few leaves had dropped. This work proved that small amounts of ammonia not only have no defoliant effect, but actually close the plant stomata thereby rendering the plant immune to subsequent normally effective amounts of ammonia for prolonged periods. This work further showed that the conventional port arrangement, in the mouth of the hood, permitted sufficient ammonia drift to effect at least the outer leaves of plants in adjacent rows, and that not only did such drift ammonia have no defoliant activity, but that it actually immunized the contacted leaves to subsequent defoliation when the defoliator returned to these adjacent rows.

EXAMPLE V

Defoliation was ≅ ca. 95%, i.e., at least about 95%, complete within 10 days when cotton plants in rows near those used in Example IV were treated with gaseous ammonia at a rate of about 75 pounds per acre. The plants used in this example did not receive the pretreatment with about 10 pounds of ammonia per acre that was used in Example IV. Aside from this the two runs, which were made on the same day, were identical.

EXAMPLE VI

Using the "mist" embodiment of this invention, liquid ammonia at about 60 pounds per acre was fed into 10-foot elongated contacting zones through ports located directly behind the flared mouth portion of each contacting zone while moving the zones lengthwise along cotton rows at about 4 miles per hour. Leaves on plants exiting the contacting zones were lighter green than those of untreated plants, and within about ½ hour the treated leaves had turned bronze. Defoliation of the treated plants was ≧ ca. 93% complete at the end of 12 days.

EXAMPLE VII

Using the process of this invention, a field of soy beans infested with cockleburs was treated with gaseous ammonia at a rate of about 90 pounds of ammonia per acre. Leaves of both bean and weed plants exiting the elongated contacting zone were lighter in color than the leaves of untreated plants. Within about ½ hour the treated leaves changed to a bronze color; after a few hours they felt dry when touched. Defoliation of both beans and weeds was ≧ ca. 96% complete about 6 days after applying the ammonia.

While our invention has been described by reference to specific details of certain embodiments, it is not intended that the invention be construed as limited to such details except insofar as they appear in the appended claims.

What is claimed is:

An ammonia defoliator for subjecting plants to exposure to ammonia comprising an elongated hood including a flared mouth section of fixed dimensions joined to a body section at a juncture, means for admitting ammonia into said defoliator, said means including ports positioned in the fore portion of said hood within said body section immediately behind said juncture, and water spray means positioned directly on the top of the exit terminal of said body section of said elongated hood, said spray means being adapted to dissolve unused ammonia escaping from said hood and carrying the resulting solution to the soil.

References Cited by the Examiner

UNITED STATES PATENTS

| | | | |
|---|---|---|---|
| 1,669,435 | 5/1928 | Wheeler | 47—1.7 |
| 2,368,601 | 1/1945 | Torley. | |
| 2,576,080 | 11/1951 | Tischler. | |
| 2,682,728 | 7/1954 | Nisbet. | |
| 2,977,715 | 4/1961 | Lindsay | 47—1 X |
| 2,988,440 | 6/1961 | Bartlett. | |
| 3,095,298 | 6/1963 | Fisher. | |

ABRAHAM G. STONE, *Primary Examiner.*

T. GRAHAM CRAVER, *Examiner.*

UNITED STATES PATENT OFFICE
CERTIFICATE OF CORRECTION

Patent No. 3,238,668

March 8, 1966

Earl C. Abbott et al.

It is hereby certified that error appears in the above numbered patent requiring correction and that the said Letters Patent should read as corrected below.

In the grant, lines 3 and 4, for "assignors to W. R. Grace & Co., of New York, N. Y., a corporation of Connecticut," read -- assignors, by mesne assignments, to Chevron Research Company, a corporation of Delaware, --; line 13, for "W. R. Grace & Co., its successors" read -- Chevron Research Company, its successors --; and in the heading to the printed specification, lines 5 to 7, for "assignors to W. R. Grace & Co., New York, N. Y., a corporation of Connecticut" read -- assignors, by mesne assignments, to Chevron Research Company, a corporation of Delaware --.

Signed and sealed this 5th day of September 1967.

(SEAL)
Attest:

ERNEST W. SWIDER
Attesting Officer

EDWARD J. BRENNER
Commissioner of Patents